US006594480B1

(12) United States Patent
Montalvo et al.

(10) Patent No.: US 6,594,480 B1
(45) Date of Patent: Jul. 15, 2003

(54) APPARATUS AND METHOD FOR AUTOMATICALLY PRIORITIZING TELEPHONE DIALING STRINGS

(75) Inventors: Robinson Montalvo, Raleigh, NC (US); Hugh C. Willard, Raleigh, NC (US); John J. Hayes, Jr., Wake Forest, NC (US)

(73) Assignee: Ericsson, Inc., Research Triangle Park, NC (US)

( * ) Notice: Subject to any disclaimer, the term of this patent is extended or adjusted under 35 U.S.C. 154(b) by 0 days.

(21) Appl. No.: 09/434,262

(22) Filed: Nov. 5, 1999

(51) Int. Cl.[7] .................................................. H04M 9/00
(52) U.S. Cl. ........................ 455/401; 379/355; 455/460
(58) Field of Search ................................. 455/401, 460, 455/564, 565, 415, 416

(56) References Cited

U.S. PATENT DOCUMENTS

| 5,455,858 A | * | 10/1995 | Lin |
| 5,651,056 A | * | 7/1997 | Eting |
| 5,787,148 A | * | 7/1998 | August ........................ 379/52 |
| 5,917,904 A | * | 6/1999 | Theis |
| 6,128,482 A | * | 10/2000 | Nixon |
| 6,148,197 A | * | 11/2000 | Bridges |
| 6,148,202 A | * | 11/2000 | Worthham |
| 6,292,833 B1 | * | 9/2001 | Liao |
| 6,304,881 B1 | * | 10/2001 | Halim |
| 6,311,282 B1 | * | 10/2001 | Nelson |
| 6,339,707 B1 | * | 1/2002 | Wainfan |

FOREIGN PATENT DOCUMENTS

| EP | 0 454 648 A2 | 4/1991 |
| WO | 9836543 | 8/1998 |

* cited by examiner

*Primary Examiner*—Nguyen T. Vo
*Assistant Examiner*—Nghi H. Ly
(74) *Attorney, Agent, or Firm*—Moore & Van Allen PLLC; Steven B. Phillips

(57) ABSTRACT

In a telecommunications device having a memory, a user input device, and a modem for connection to an external network, each controlled by a processor, a dialing apparatus is provided for connection to the external network. The dialing apparatus includes a dialer program operating in the telecommunications device for prioritizing a plurality of different dialing strings, highest to lowest, each associated with the external network for connection of the telecommunications device to the external network based on the location of the telecommunications device.

29 Claims, 8 Drawing Sheets

FIG. 1

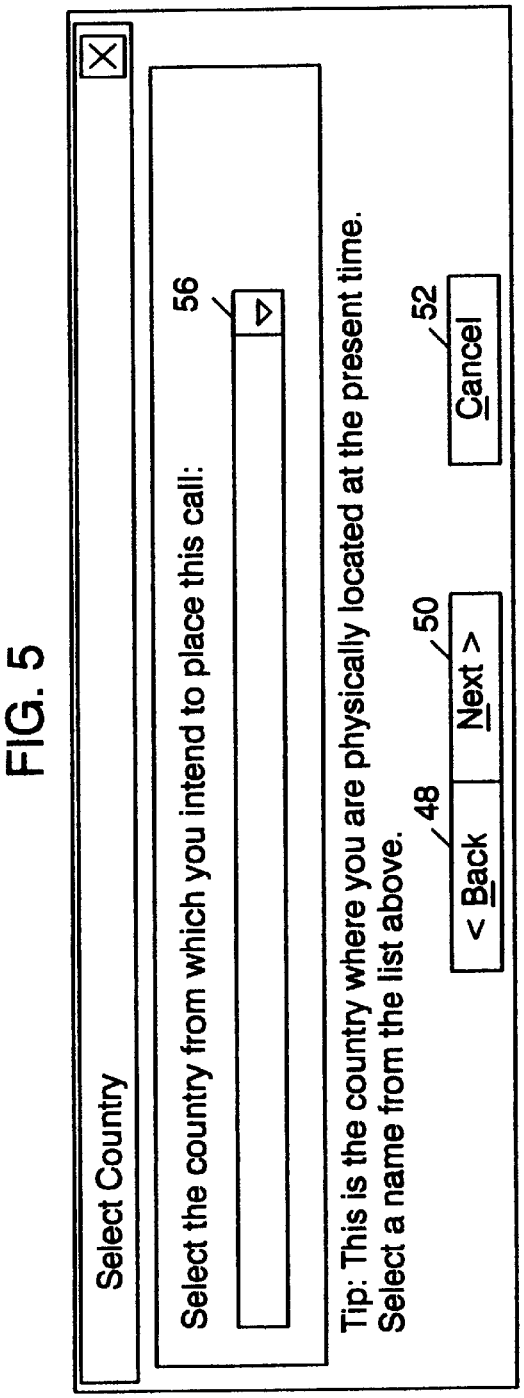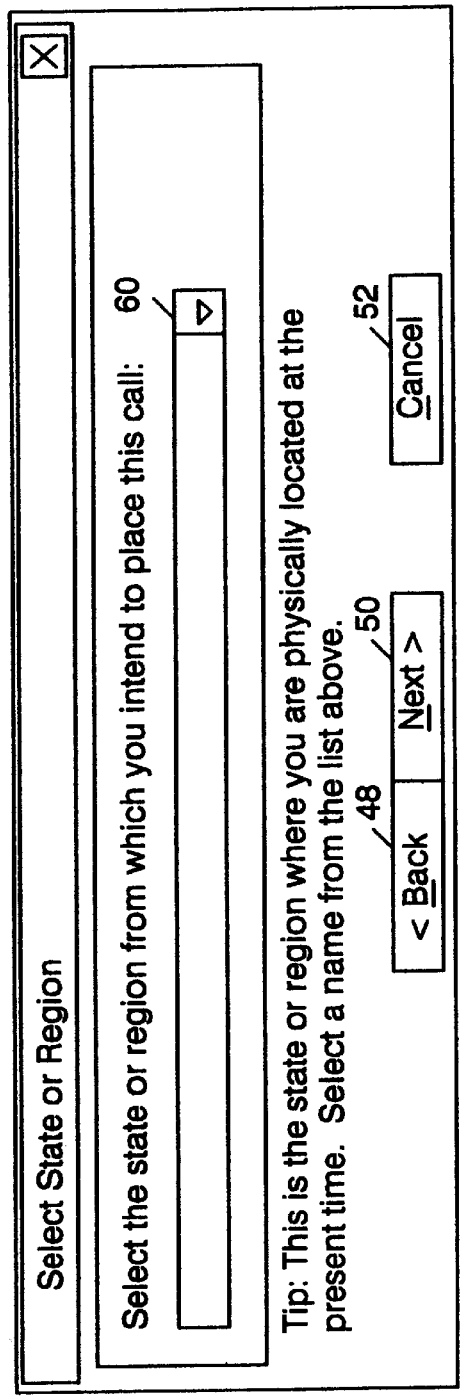

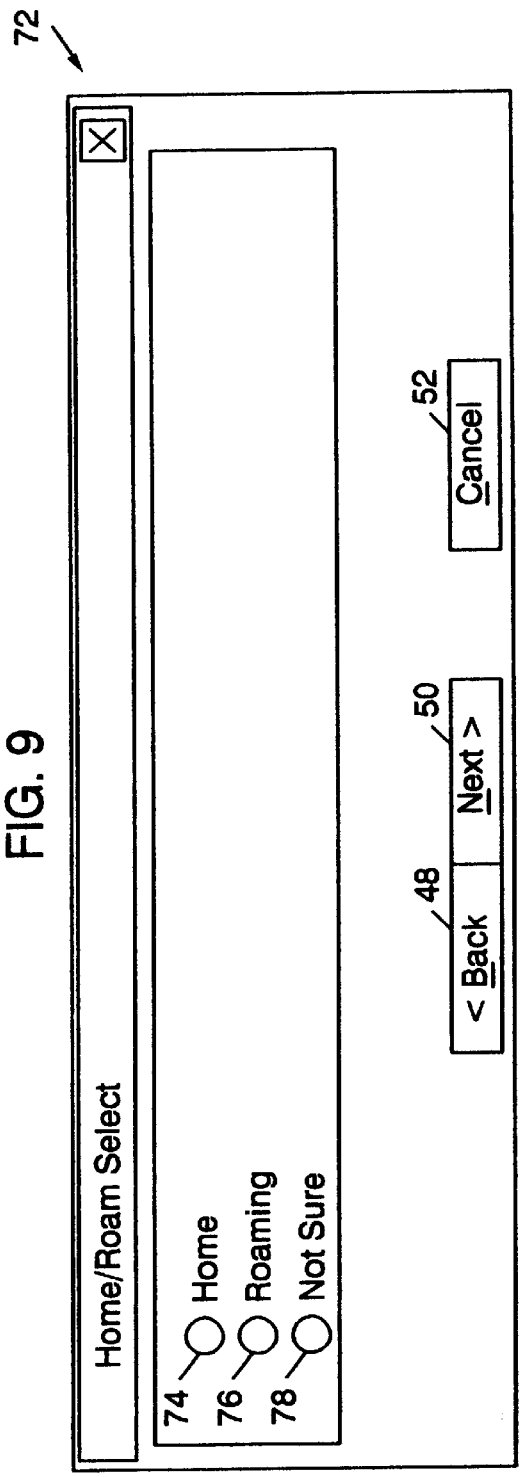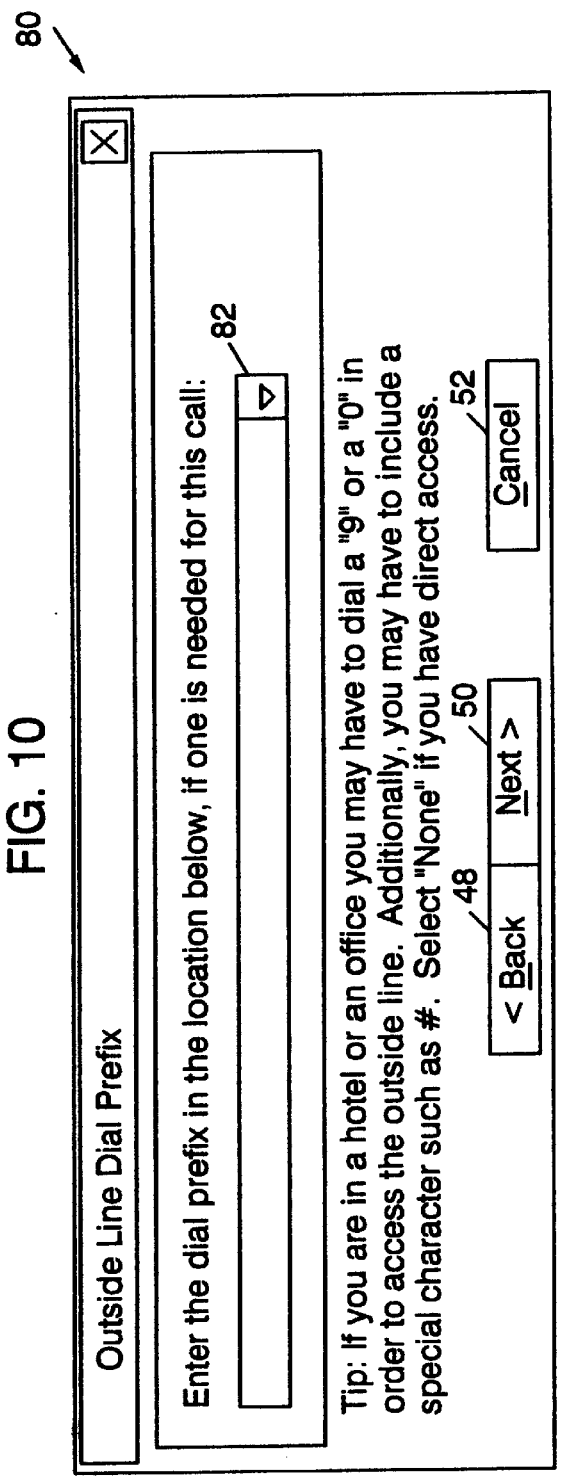

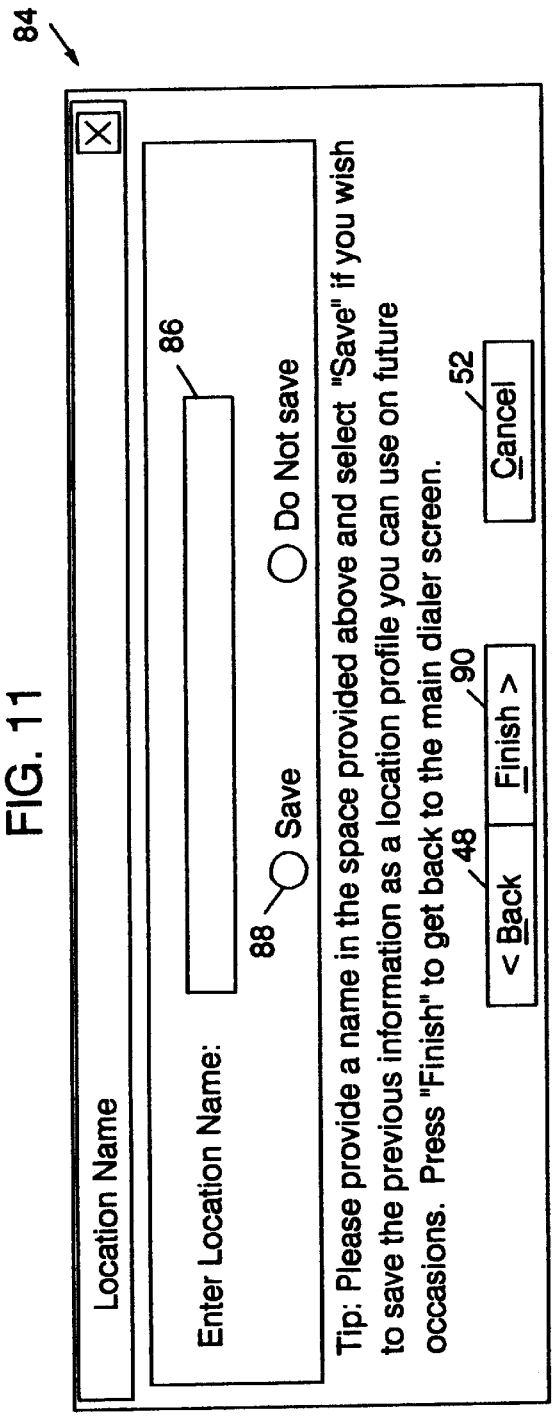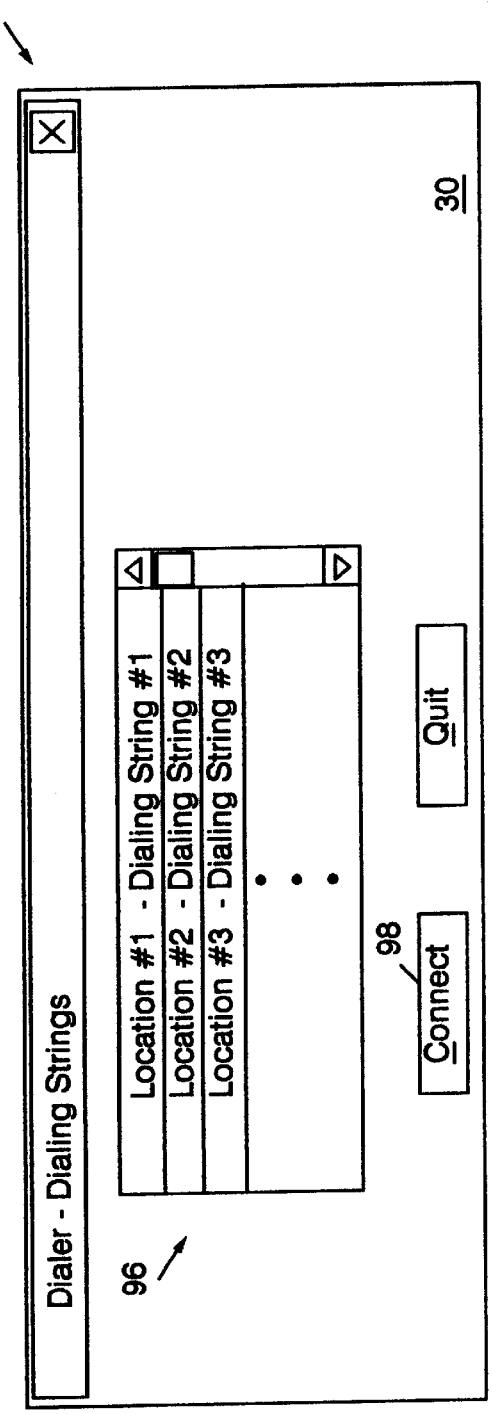

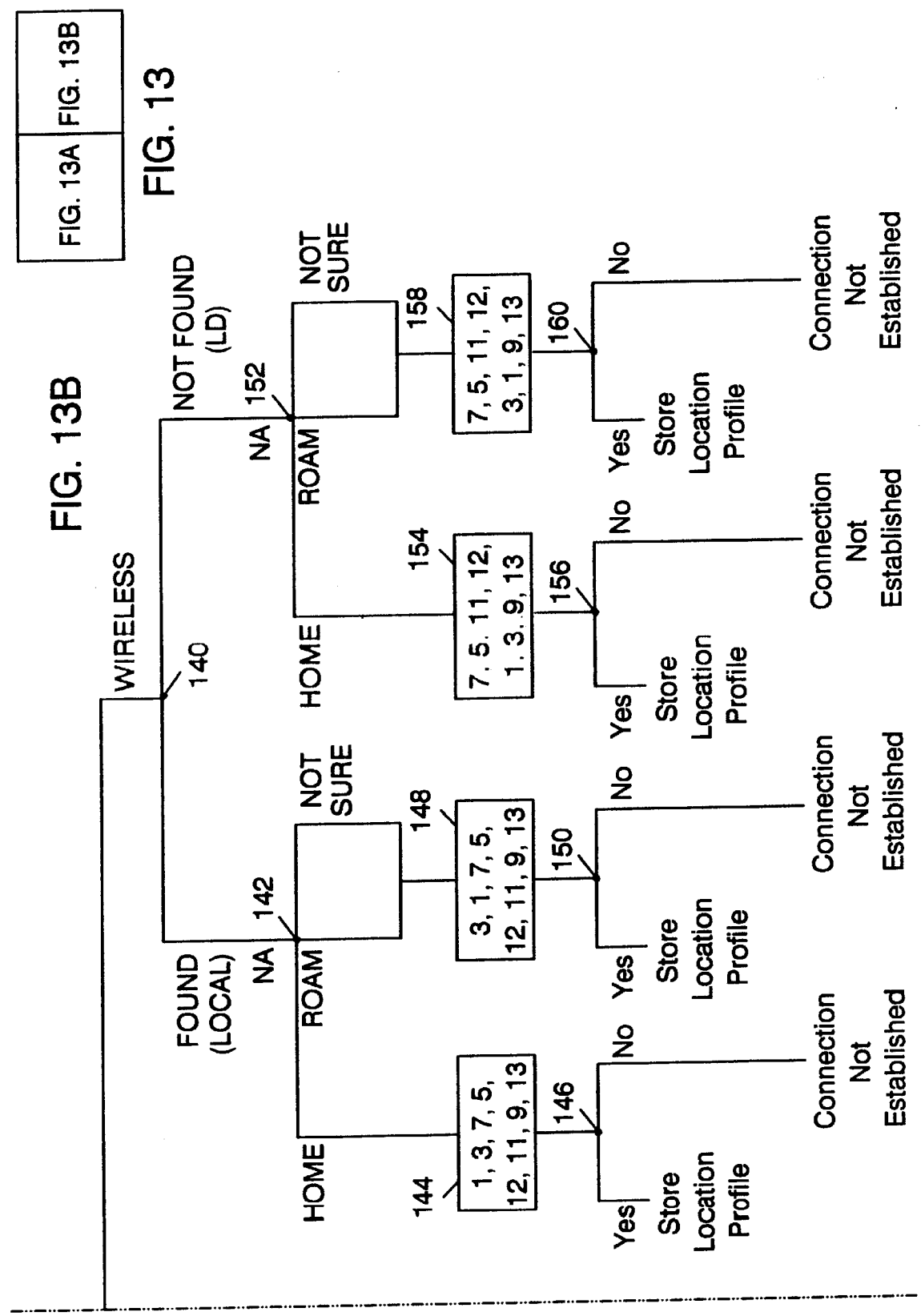

APPARATUS AND METHOD FOR AUTOMATICALLY PRIORITIZING TELEPHONE DIALING STRINGS

FIELD OF THE INVENTION

The present invention relates to a dialer capable of automatically prioritizing telephone dialing strings and, more particularly, to a dialer capable of automatically prioritizing a list of telephone dialing strings for a telecommunications device and automatically dialing the prioritized list of dialing strings for connection to an external network.

BACKGROUND OF THE INVENTION

The number and extent of computer-accessible networks has risen rapidly in recent years, with the most notable example being the Internet. Many of these networks are based on what is known as a client-server model. In this model, a user uses a computer (which includes hardware and software), also called a client device, to exchange data with a server on the network. In some cases, connection is established with the network server by means of a "dial-up connection". In a dial-up connection, a phone call is placed by the client on a telephone system (which may be wired or wireless) and a modem attached to the client device establishes a data connection with a modem attached to the network server. Data is then exchanged between the client device and the network server over the telephone system.

A software application commonly referred to a "dialer" generally resides in the client device and is utilized in making dial-up connections. Based upon input from the user, and possibly stored information such as data files or a database of phone numbers, etc., the dialer determines the appropriate number (one dialing string) to dial and places the call. If the call is successful, a data connection is established with the network server. If the call is unsuccessful, the dialer simply informs the user of the failed attempt and waits for further input from the user.

Many current and potential users of dial-up networking struggle to make successful data connections. If the first attempt at a connection fails, many users are not technically sophisticated enough to correct a problem. This is a particular concern with mobile users. If the user is not mobile, i.e., the user is routinely making a connection from a single location such as from a home or office, the user can oftentimes obtain help from co-workers or others at home if dialing or connection problems occur. Furthermore, once the problem is fixed, it generally stays fixed since the user is calling from the same location each time. Mobile users, however, routinely encounter dialing problems as they move from place to place. Oftentimes, they are in situations where help is not readily available. For example, some of the dialing problems that a mobile user may encounter are as follows:

(1) Dialing rules for calls on wired (Public Switched Telephone Network) networks are different than for calls on wireless (cellular) networks.

(2) For wired calls, some locations such as hotels and offices require a first digit to be dialed to obtain an outside line. The actual digit used is often "9", but may vary from location to location.

(3) Some populated areas of the country now require the area code to be utilized for local as well as long distance calls.

Other than re-dialing numbers when a busy signal occurs, dialers have no capability to recover from a failed dialing attempt. User intervention is necessary to make the connection successful. However, if the user does not know what to do to correct the problem, successful connection to the network is unlikely.

SUMMARY OF THE INVENTION

In a telecommunications device having a memory, a user input device, and a modem for connection to an external network, each controlled by a processor, a dialing apparatus is provided for connection to the external network. The dialing apparatus includes a dialer program operating in the telecommunications device for prioritizing a plurality of different dialing strings, highest to lowest, each associated with the external network for connection of the telecommunications device to the external network based on the location of the telecommunications device.

The plurality of different dialing strings, each associated with the external network, is stored in the memory of the telecommunications device. The dialer program receives, via the user input device, (a) a selected dialing string from the plurality of different dialing strings, and (b) user related information including (b1) whether connection to the external network is to be wireless or wired, (b2) if the connection to the external network is to be wired, whether a dial prefix is needed to obtain an outside line, and (b3) if the connection to the external network is to be wireless, whether the telecommunications device is in its home system or roaming. The dialer program develops the prioritized list of dialing strings based upon the selected dialing string and the stored user related information.

In one form, the dialer program automatically dials the dialing string having the highest priority from the prioritized list. If connection to the external network is unable to be established by dialing the highest priority dialing string, the dialer program automatically dials the other dialing strings in the prioritized list, in turn in accordance with their priority listing, until connection to the external network is established or all dialing strings have been exhausted. The condition of being unable to establish connection to the external network does not include obtaining a busy signal.

In another form, each of the plurality of different dialing strings includes associated location information. The dialer program receives location information for a current location of the telecommunications device via the user input device and compares the current location information of the telecommunications device with the location information associated with the selected dialing string. If they match, the dialer program prioritizes local calls higher than long distance calls. If they do not match, the dialer program prioritizes long distance calls higher than local calls.

The location information for the current location of the telecommunications device may be obtained by activating either a GPS receiver or cellular positioning equipment resident within the telecommunications device.

The telecommunications device may include a laptop computer having both wired and wireless modems for connection to the external network.

In yet another form, if a dial prefix is needed to obtain an outside line, the dialer program develops a prioritized list of dial prefixes for obtaining the outside line. The prioritized list of dial prefixes may include, in order, a user provided dial prefix, if any, and then 9, 0, 8, 7, 6, 5, 4, 3, 2 and 1, skipping over the user provided dial prefix, if any.

In still another form, if a dial prefix is needed to obtain an outside line, the dialer program determines an appropriate dial prefix for obtaining the outside line by first dialing the dial prefix having the highest priority from the prioritized list. If a dial tone is not detected, the dialer program dials the other dial prefixes in the prioritized list, in turn in accordance with their priority listing, until a dial tone is detected or all dial prefixes have been exhausted.

A method is also provided for compiling a list of telephone dialing strings for a telecommunications device for connection of the telecommunications device to a network external to the telecommunications device. The method generally includes the steps of storing a plurality of different dialing strings each associated with the external network, selecting one of the plurality of different dialing strings based on the location of the telecommunications device, storing user related information including (a) whether connection to the external network is to be wireless or wired, (b) if the connection to the external network is to be wired, whether a dial prefix is needed to obtain an outside line and (c) if the connection to the external network is to be wireless, whether the telecommunications device is in its home system or roaming, and developing a list of dialing strings varying from highest priority to lowest priority based upon the selected dialing string and the stored user related information.

An object of the present invention is to improve dialer sophistication such that a successful dial-up connection can be made on behalf of the user when dialing problems occur. A further object of the present invention is to so without user intervention.

Other aspects, objects and advantages of the present invention can be obtained from a study of the application, the drawings, and the appended claims.

BRIEF DESCRIPTION OF THE DRAWINGS

FIGS. 5–7 show screens associated with entering location information of the telecommunications device, including the current country, state and city in which the telecommunications device is located;

FIG. 9 shows a screen for entering whether the telecommunications device is in its home system or roaming for a wireless connection;

FIG. 10 shows a screen for entering whether a dial prefix is needed to obtain an outside line for a wired connection;

FIG. 11 shows a screen for saving previously entered information as a location profile;

FIG. 12 is a screen illustrating the various dialing strings included within the number list of FIG. 2.

FIG. 13 is shown divided into FIGS. 13A and 13B.

DETAILED DESCRIPTION OF THE INVENTION

Figure 1:
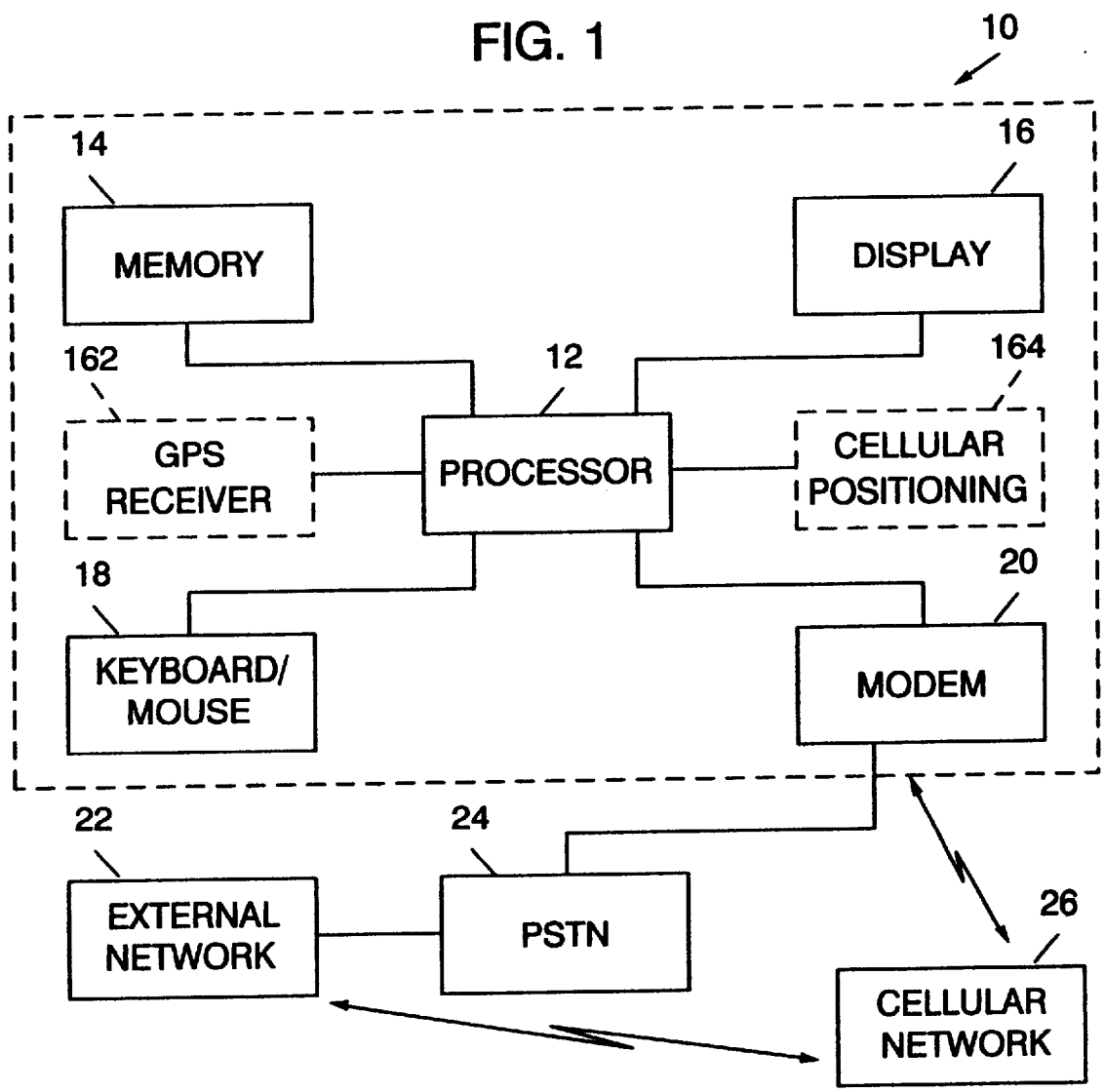
FIG. 1 is a block diagram of a telecommunications device implementing the inventive dialer for connection to an external network via a Public Switched Telephone Network or a cellular network.

The invention provides an apparatus and method for compiling a list of telephone dialing strings for the connection of a telecommunications device to an external network. FIG. 1 illustrates an exemplary telecommunications device, shown generally at 10, including a processor 12, a memory 14, a display 16, a user input device 18, such as a keyboard and/or a mouse, and a modem 20 for connection to a network 22 external from the telecommunications device 10. In a preferred form, the telecommunications device 10 is a laptop computer. The modem 20 may be wired and/or wireless establishing connection to the external network 22 via either a wired PSTN (Public Switched Telephone Network) network 24 or a wireless cellular network 26. The modem 20 may include two separate modems, one wired and one wireless, each separately activatible by a user via the user input device 18.

Figure 2:
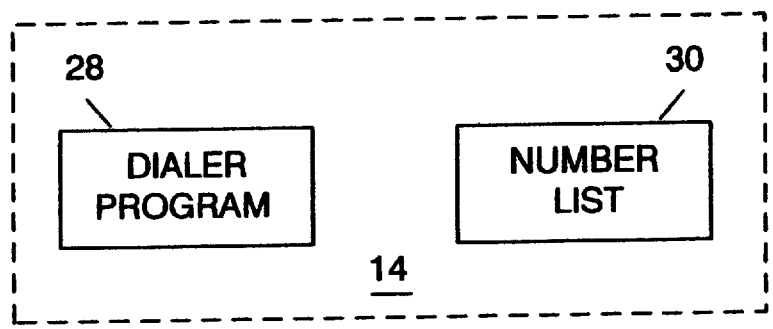
FIG. 2 is a block diagram of the memory included in the telecommunications device of FIG. 1 including a dialer program and a number list resident within.

As shown in FIG. 2, resident within the memory 14 is a dialer program, or dialer, 28 and a provider number list 30. When accessed by a user of the telecommunications device 10, the dialer program 28 compiles a prioritized list of telephone dialing strings from the provider number list 30 for connection to the external network 22. Operation of the dialer program 28 is described below.

Figure 3:
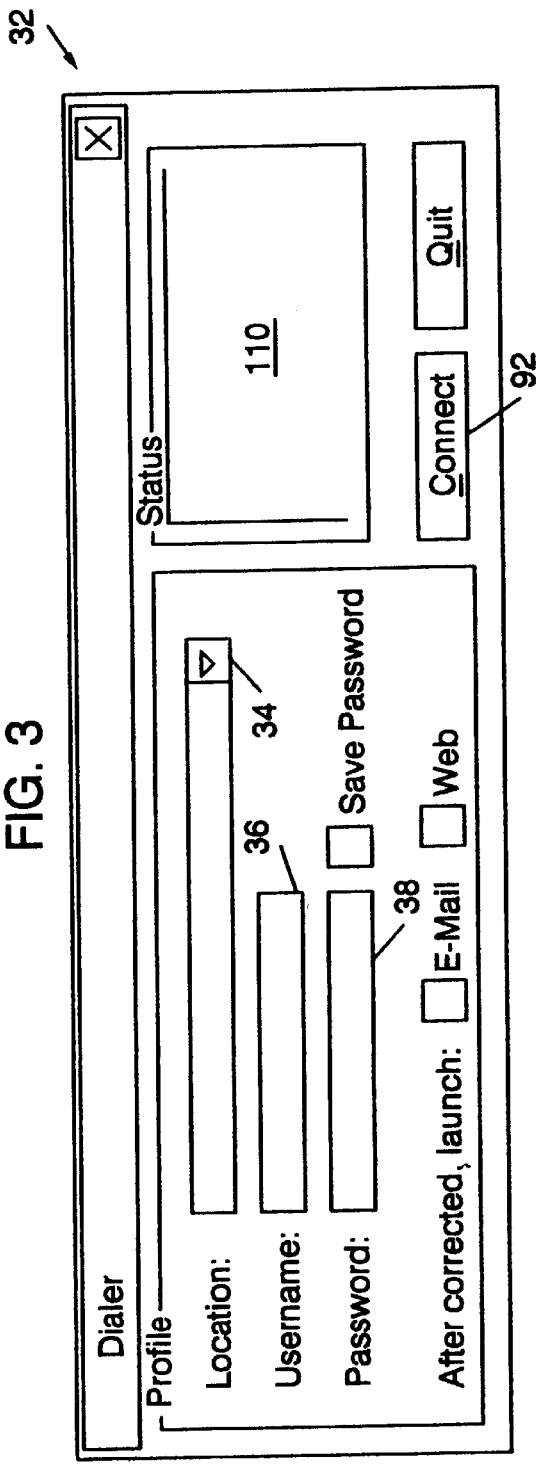
FIG. 3 shows an initial screen appearing upon activation of the dialer program.

Upon a user of the telecommunications device 10 activating the dialer program 28 via the user input device 18, the screen 32 shown in FIG. 3 will appear on the display 16. Using the mouse 18, the user clicks on button 34 to obtain a drop down list (not shown) of location profiles. From this drop down list, the user selects his/her current location from which he/she is attempting to access the external network 22. The location profiles are locations from which the user has previously accessed the external network 22 and has stored pertinent information pertaining thereto in the memory 14. In addition to the various location profiles, the drop down list will also include a selection entitled NEW/MODIFY/DELETE PROFILE. By clicking on this selection, the user will be lead through a location program resident within the dialer program 28.

The user is also required to type in a log-in or user ID number at area 36. For example, a user wishing to access the Internet will be given a user ID number by its specified Internet Service Provider, such as, for example, AOL, MCI, Prodigy, MSN, etc. The user's password enabling them to access their Internet account is then entered at area 38.

Figure 4:
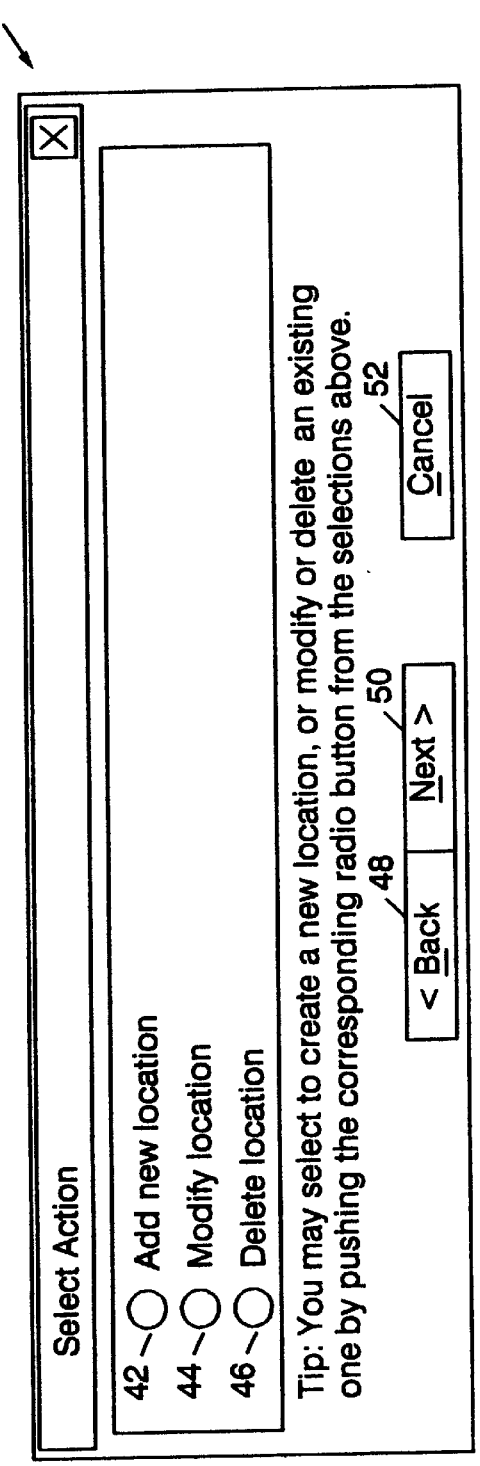
FIG. 4 shows a screen for adding, modifying or deleting locations associated with the dialer program.

Assuming the user is at a location not listed in the drop down location profile list, the NEW/MODIFY/DELETE PROFILE listing is selected. This activates a location program resident with the dialer program 28 and a screen 40, shown in FIG. 4, appears on the display 16. The user selects whether he/she wishes to add a new location 42, modify a location 44, or delete a location 46. The location program leads a user one window at a time through the process of creating, modifying or deleting a location profile. Each window prompts the user for an input and also contains "back" 48, "next" 50 and "cancel" 52 buttons which the user can select at any time. The "back" button 48 permits a user to look at previous windows and change input if desired. The "next" button 50 sends the user to the next window. The "cancel" button 52 ends the location program and returns the user to the dialer program at screen 30 (FIG. 3).

Assuming the user wishes to add a new location 42 at screen 40, the user selects "Add new location" at 42 and clicks the "next" button 50. A select country screen 54, shown in FIG. 5, appears on the display 16. Clicking the button 56 will provide the user with a drop down list (not shown) of countries. The user selects a country where he/she is physically located at the present time from the drop down list and then clicks the "next" button 50.

A select state or region screen 58, shown in FIG. 6, then appears on the display 16. Clicking the button 60 provides the user with a drop down list (not shown) of states or regions. The user selects the state or region where he/she is physically located at the present time and then clicks the "next" button 50.

Figure 7:
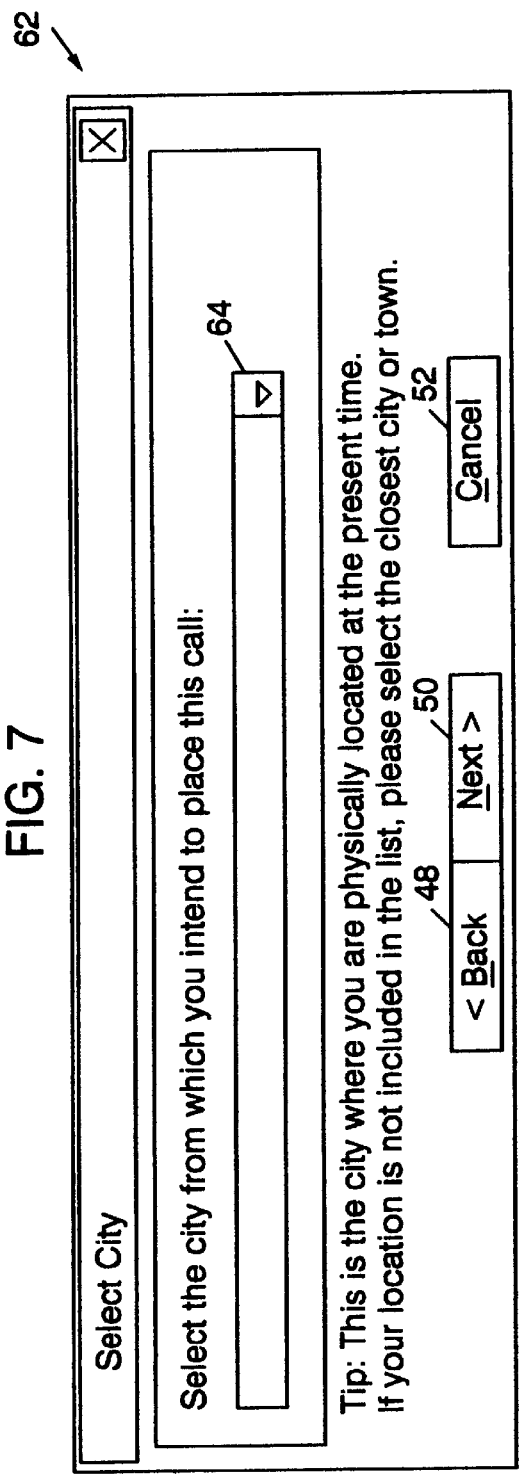
Figure 8:
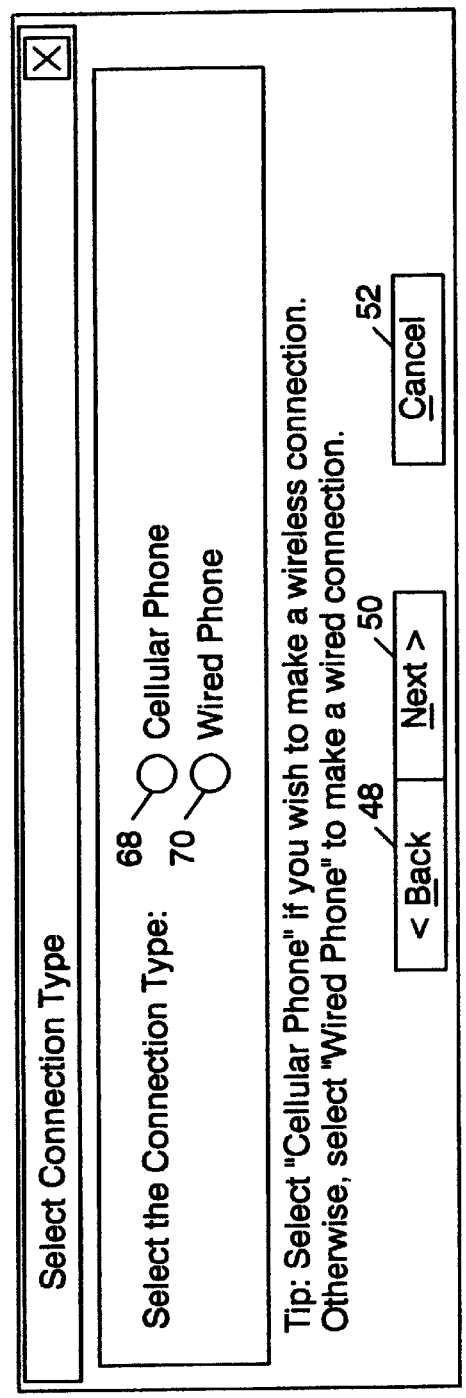
FIG. 8 shows a screen for entering whether a connection is to be wired or wireless.

A select city screen 62, shown in FIG. 7, then appears on the display 16. Clicking the button 64 provides the user with a drop down list (not shown) of cities. The user selects the city where he/she is physically located at the present time. If the location (city) of the user is not included in the drop down list, the user selects the city or town closest to him/her. It should be noted that if the country selected at screen 54 (FIG. 5) has no states or regions, the select state or region screen 58 (FIG. 6) will be bypassed and the select city screen 62 will appear immediately thereafter. Clicking the "next" button 50 on the select city screen 62 provides the user with a select connection type screen 66, shown in FIG. 8, on the display 16. At the screen 66, the user selects whether the connection is to be a cellular (wireless) connection 68 or a wired connection 70.

If the user selects a cellular connection ("Cellular Phone") 68 at the screen 66, clicking the "next" button 50 produces a home/roam screen 72, shown in FIG. 9, on the display 16. At the home/roam screen 72, the user selects whether he/she is in his/her home system 74, is roaming 76, or is unsure whether he/she is roaming 78. If "not sure" 78 is selected by the user, the dialer program 28 assumes that the user is roaming.

If a wired connection ("Wired Phone") 70 is selected at the screen 66, clicking the "next" button 50 produces an outside line dial prefix screen 80, shown in FIG. 10, on the display 16. Clicking the button 82 provides the user with a drop down list (not shown) of dial prefixes for obtaining an outside line. In addition to the digits 0–9, the drop down list also provides selections for #, *, NOT SURE, NONE. The user selects the appropriate dial prefix, if any, and clicks the "next" button 50.

Clicking the "next" button 50 at either of the screens 72 (FIG. 9) or 80 (FIG. 10) provides a location name screen 84, shown in FIG. 11, on the display 16. At the screen 84, the user may save the previously entered information as a location profile. The user simply types in a recognizable name at area 86 and selects the "save" button 88. For instance, if the user is attempting a connector from a Howard Johnson's hotel in Raleigh, North Carolina, the user may wish to save the previous information provided in the various screens as "HoJo's—Raleigh, N.C.". Generally, the saved name is personalized and easily recognizable by the user. The saved name is added to the location profile drop down list at screen 32 (FIG. 3).

Whether or not the location information is saved, clicking the "finish" button 90 on the screen 84 takes the user back to the dialer screen 32 of FIG. 3. It should be noted that if the user selects a location that has been previously stored at the screen 32, the dialer program 28 will not take the user through the various steps of inputting information, but will rather use the information previously stored in the selected location profile. Modifying a location profile (selection 44 at screen 40—FIG. 4) is essentially the same as creating a new location profile, however, when each screen appears on the display 16 the selection previously made by the user and stored will also appear. Thus, the user can see the stored information associated with the selected location profile and modify it accordingly. Should the user wish to delete a location (selection 46 at screen 40—FIG. 4), the location program will simply ask the user which location he/she wishes to delete.

Referring to FIG. 3, once the user has selected an appropriate location at screen 32 and supplied the required information, if needed, the user clicks the "connect" button 92 on the dialer screen 32 to place the call. Upon clicking the "connect" button 92, the provider number list 30, shown in FIG. 12, will appear on the display 16 at screen 94. The provider number list 30 includes a list of numbers for various locations, shown at 96, which the user may dial to access the external network 22. For instance, if the user is attempting to access the Internet and has MCI as its Internet Service Provider, the provider number list 30 will include a list of numbers, or dialing strings, provided by MCI for various cities, or locations, worldwide which the user may dial to access the Internet via MCI. Accordingly, if the user is at location #1, he/she can dial dialing string #1 and place a local call to access the Internet via MCI. The same is true if the user is at location #2, location #3, etc. The user selects the dialing string from the provider number list 30 which is associated with the city or location at which the user is currently located. If the user's location is not included in the list, the dialing string associated with the closest city or town is selected. Clicking the "connect" button 98 on the screen 28 activates the dialer program 28 to begin processing the call and prioritizing a list of dialing strings for connection to the external network 22.

The collection of all possible dialing strings are defined below in Tables 1 and 2. The following nomenclature is used:

D=7 digit "core" number,

A=3 digit area code,

1="1" prefix for long distance calls,

0="0" prefix for long distance calls, and

N=single digit needed for outside line.

If the call is to be a wired call, Table 1 below provides the list of dialing strings utilized by the dialer program 28.

TABLE 1

Collection of dialing strings for wired calls.

| Case Number | String Number | Dialing String | Overlapping Area Codes | Long Distance/Local Call | Outside Line Required |
|---|---|---|---|---|---|
| 1 | 1 | D | No | Local | No |
| 2 | 2 | N-D | No | Local | Yes |
| 3 | 3 | A-D | Yes | Local | No |
| 4 | 4 | N-A-D | Yes | Local | Yes |

TABLE 1-continued

Collection of dialing strings for wired calls.

| Case Number | String Number | Dialing String | Overlapping Area Codes | Long Distance/Local Call | Outside Line Required |
|---|---|---|---|---|---|
| 5 | 5 | 1-D | N/A | Long distance-same area code | No |
| 6 | 6 | N-1-D | N/A | Long distance-same area code | Yes |
| 7 | 7 | 1-A-D | | Long distance-different area code | No |
| 8 | 8 | N-1-A-D | | Long distance-different area code | Yes |
| 9 | 9 | 1-800-D | N/A | 800 Number | No |
| 10 | 10 | N-1-800-D | N/A | 800 Number | Yes |

If the call is to be a wireless call, Table 2 below provides the dialing strings utilized by the dialer program 28.

TABLE 2

Collection of dialing strings for wireless calls.

| Case Number | String Number | Dialing String | Overlapping Area Codes | Long Distance/Local Call | Home/ Roaming |
|---|---|---|---|---|---|
| 1 | 1 | D | No | Local | Home |
| 2 | 3 | A-D | No | Local | Roam |
| 3 | 3 | A-D | Yes | Local | Home |
| 4 | 3 | A-D | Yes | Local | Roam |
| 5 | 5 | 1-D | N/A | Long distance-same area code | Home |
| 6 | 7 | 1-A-D | N/A | Long distance-same area code | Roam |
| 7 | 7 | 1-A-D | N/A | Long distance-different area code | Home |
| 8 | 7 | 1-A-D | N/A | Long distance-different area code | Roam |
| 9 | 11 | 0-D | N/A | LOng distance-same area code | Home |
| 10 | 12 | 0-A-D | N/A | Long distance-same area code | Roam |
| 11 | 12 | 0-A-D | N/A | Long distance-different area code | Home |
| 12 | 12 | 0-A-D | N/A | Long distance-different area code | Roam |
| 13 | 9 | 1-800-D | N/A | N/A | N/A |
| 14 | 13 | 0-800-D | N/A | N/A | N/A |

In Tables 1 and 2 above, the recitation "same area code" that the area code of the location from which the call is being made cation of the user) is the same as the area code of the location being called (the location associated with the dialing string chosen by the user from the provider number list 30). The recitation "different area code" means that the area code of the location from which the call is being made is not the same as the area code of the location being called.

Figure 13A:
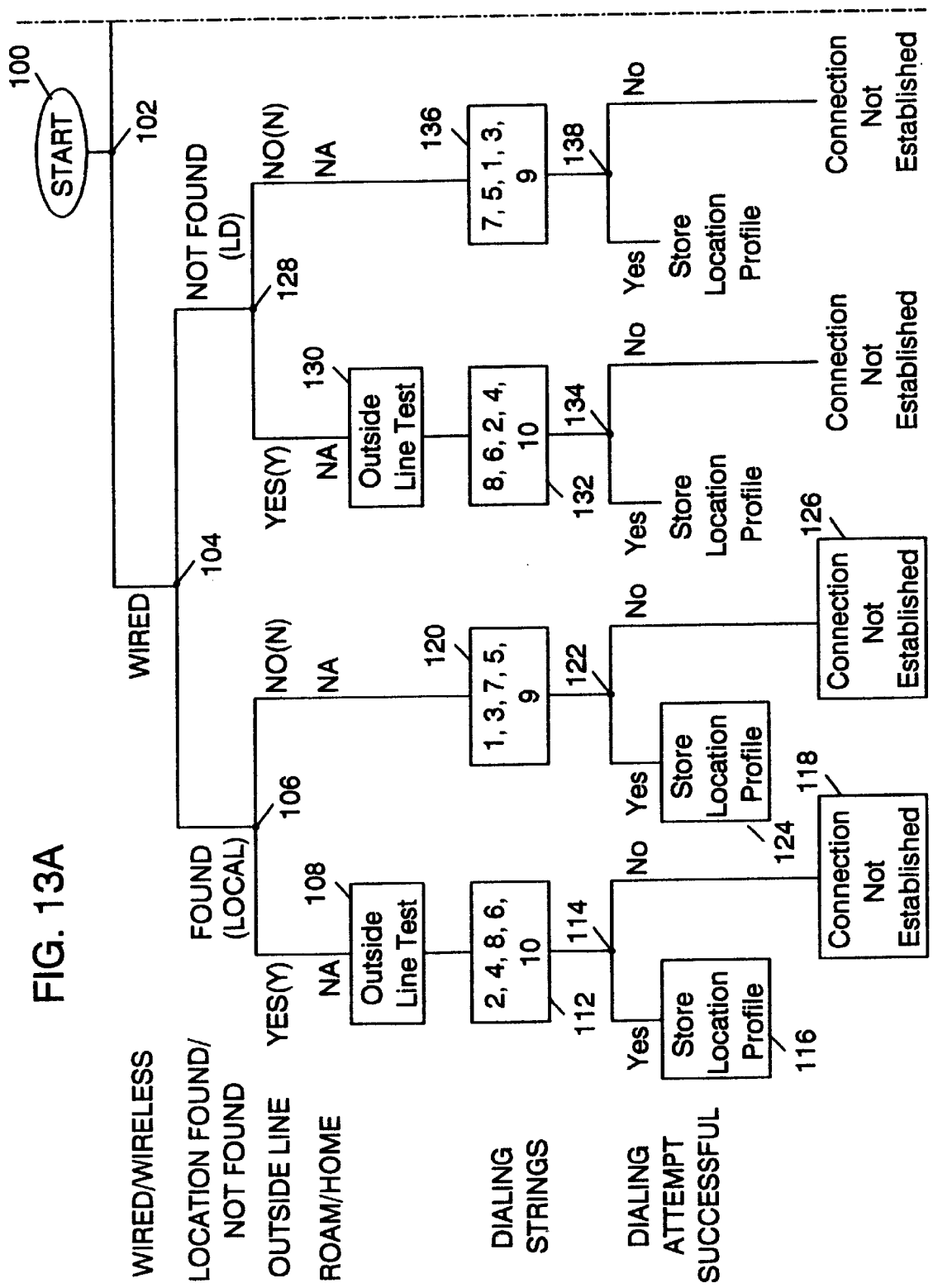
FIG. 13 shows a decision tree illustrating operation of the dialer program in connecting the telecommunications device to an external network.

With reference to the flow chart of FIG. 13, the dialer program 28 operates to prioritize calls as follows. FIG. 13 is presented as FIGS. 13A and 13B for clarity.

Upon clicking the "connect" button 98 at the screen 94 (see FIG. 12), the dialer program 28 starts operation at a block 100. At a node 102, the dialer program 28 determines whether the call is wired or wireless as input by the user at the screen 66 (see FIG. 8). If the call is a wired call, the dialer program 28, at a node 104, determines whether the location of the user, as input by the user, is the same as the location associated with the dialing string selected at the screen 94 (see FIG. 12). For example, if the user chose dialing string #1 in FIG. 12, the dialer program 28 compares location #1 associated with dialing string #1 with the location of the user as input by the user. If the locations are the same, the dialer program 28 prioritizes local calls higher than long distance calls and determines whether a dial prefix is needed to obtain an outside line at a node 106. If an outside line is needed, the dialer program 28 performs an outside line test at a block 108. The outside line test is essentially performed as follows.

The modem 20 is taken off-hook. The modem 20 waits approximately five seconds for a dial tone. If no dial tone is detected, the dialing program is terminated and an error message in a status field 110 of the screen 32 (FIG. 3) is displayed stating that no dial tone was detected. Otherwise, the modem 20 dials a user-supplied number in an attempt to obtain an outside line, or, if the user did not provide a number (i.e., selected "NOT SURE" from the list), the modem 20 first uses the dial prefix "9". The modem 20 then waits approximately five seconds for a dial tone. If a dial tone is detected, the selected number is stored and the dialer program 28 continues. If a dial tone is not detected, the modem 20 is placed on-hook. The digits 0, 8, 7, 6, 5, 4, 3, 2 and 1 (in order) are used until an outside line is found, resulting in storage of the number and continued execution of the dialer program 28. If the user has provided a number which previously failed, this number is skipped over. Failure to find an outside line terminates the dialer program 28 and displays an error message in the status field 110 of screen 32 (FIG. 3).

Assuming that the outside line test at the block 108 was successful, the dialer program 28 then prioritizes the various dialing strings set forth in Table 1 at a block 112. In this particular instance, the dialing strings are prioritized, highest to lowest, as set forth in the block 112, namely, #'s 2, 4, 8, 6, 10. It should be noted that Table 1, as well as Table 2, provides both case numbers and string numbers. The flow chart of FIG. 13 refers to the string numbers.

After prioritizing the dialing strings at the block 112, the dialer program 28, at a node 114, attempts to establish connection to the external network 22 by dialing each of the prioritized dialing strings in order, highest to lowest, until a connection is established. For example, the dialer program 28 will first dial dialing string #2 in an attempt to connect to the external network 22. If connection is unable to be established via dialing string #2, the dialer program 28 will attempt the next highest priority dialing string, namely, dialing string #4 in an attempt to connect to the external network 22. This continues until all of the dialing strings are exhausted or connection to the external network 22 is established. If connection to the external network 22 is established at the node 114, the dialer program 28 stores the successful dialing string as part of the location profile, at a block 116, and connection is established to the external network 22. If connection is unable to be established at the node 114, the dialer program 28 indicates that connection could not be established in the status field 110 of the screen 32 (FIG. 3), at block 118. It should be noted that in determining whether connection is able to be established, a busy signal does not count as a failed attempt. If a busy signal is obtained, the dialer program 28 waits a predetermined period of time and then redials the particular dialing string.

If it is determined that an outside line is not necessary at the node 106, the dialer program 28 prioritizes the dialing strings associated with wired calls (Table 1) at a block 120. The dialing strings are prioritized as set forth in block 120, highest to lowest, namely, #'s 1, 3, 7, 5, 9. The dialer program 28 attempts to connect to the external network at a node 122 in the same manner as previously described with respect to the node 114 by attempting the highest priority dialing string first, etc. If connection to the external network 22 is established at the node 122, the dialer program 28 stores the successful dialing string as part of the location profile, at a block 124, and connection is established to the external network 22. If connection is unable to be established at the node 122, the dialer program 28 indicates that connection could not be established in the status field 110 of the screen 32 (FIG. 3), at block 126.

It should be noted that each time the dialer program 28 attempts to connect to the external network 22 by dialing a prioritized list of dialing strings, upon a successful connection the dialer program 28 will store the successful dialing string as part of the location profile. If the attempt at connection is unsuccessful after exhausting all possible dialing strings, the dialer program 28 will indicate that the connection could not be established in the status field 110 of the screen 32 (FIG. 3). Accordingly, discussion of this operational feature will be omitted throughout the remaining discussion of FIG. 13.

If the current location of the user does not match the location of the selected dialing string at the node 104, the dialer program 28 prioritizes long distance calls over local calls. The dialer program 28 then determines if a dial prefix is needed to obtain an outside line at a node 128. If an outside line is needed, the dialer program 28 performs an outside line test at a block 130 in the same manner as previously described with respect to the block 108. The dialer program 28 then prioritizes the dialing strings set forth in Table 1, highest to lowest, at a block 132, with the order of the prioritized dialing strings indicated in the block 132, namely, #'s 8, 6, 2, 4, 10. The dialer program 28, at a node 134, attempts to connect to the external network 22 in the same manner as previously described with respect to the node 114 by dialing the highest priority dialing string first, etc., until connection is established or all prioritized dialing strings have been exhausted.

If it is determined that an outside line is not necessary at the node 128, the dialer program 28 prioritizes the dialing strings associated with wired calls (Table 1), highest to lowest, at a block 136, with the order of the prioritized dialing strings indicated in the block 136, namely, #'s 7, 5, 1, 3, 9. The dialer program 28, at a node 138, attempts to connect to the external network 22 in the same manner as previously described with respect to the node 114 by dialing the highest priority dialing string first, etc., until connection is established or all prioritized dialing strings have been exhausted.

If it is determined at the node 102 that the connection to the external network 22 is to be a wireless connection, the dialer program 28 utilizes the collection of dialing strings as provided in Table 2 to attempt to connect to the external network 22. The dialer program 28 determines if the location of the user matches the location of the selected dialing string at a node 140. If the location-matches at the node 140, the dialer program 28 determines whether the user is in his/her home system or roaming at a node 142. If it is determined at the node 142 that the user is in his/her home system, the dialer program 28 prioritizes the dialing strings set forth in Table 2, highest to lowest, at a block 144, with the order of the prioritized dialing strings indicated in the block 144, namely, #'s 1, 3, 7, 5, 12, 11, 9, 13. The dialer program 28, at a node 146, attempts to connect to the external network 22 in the same manner as previously described with respect to the node 114 by dialing the highest priority dialing string first, etc., until connection is established or all prioritized dialing strings have been exhausted.

If it is determined at the node 142 that the user is roaming, or has selected "not sure" at the screen 72 (see FIG. 9), the dialer program 28 prioritizes the dialing strings set forth in Table 2, highest to lowest, at a block 148, with the order of the prioritized dialing strings indicated in the block 148, namely, #'s 3, 1, 7, 5, 12, 11, 9, 13. The dialer program 28, at a node 150, attempts to connect to the external network 22 in the same manner as previously described with respect to the node 114 by dialing the highest priority dialing string first, etc., until connection is established or all prioritized dialing strings have been exhausted.

If the location of the user does not match the location of the selected dialing string at the node 140, the dialer program 28 determines whether the user is in his/her home system or roaming at a node 152. If it is determined at the node 152 that the user is in his/her home system, the dialer program 28 prioritizes the dialing strings set forth in Table 2, highest to lowest, at a block 154, with the order of the prioritized dialing strings indicated in the block 154, namely, #'s 7, 5, 11, 12, 1, 3, 9, 13. The dialer program 28, at a node 156, attempts to connect to the external network 22 in the same manner as previously described with respect to the node 114 by dialing the highest priority dialing string first, etc., until connection is established or all prioritized dialing strings have been exhausted.

If it is determined at the node 152 that the user is roaming, or has selected "not sure" at the screen 72 (see FIG. 9), the dialer program 28 prioritizes the dialing strings set forth in Table 2, highest to lowest, at a block 158, with the order of the prioritized dialing strings indicated in the block 158, namely, #'s 7, 5, 11, 12, 3, 1, 9, 13. The dialer program 28, at a node 160, attempts to connect to the external network 22 in the same manner as described with respect to the node 114 by dialing the highest priority dialing string first, etc., until connection is established or all prioritized dialing strings have been exhausted.

One skilled in the art will appreciate that the dialer program 28 may be configured to prioritize the various dialing strings from most likely to succeed to least likely to succeed, or from least costly to most costly, or a variation of both.

In an alternative embodiment, upon the user selecting to add or modify a location at the screen 40 (see FIG. 4), instead of the screens 54, 58 and 62 appearing in order for a user to select his/her location from various drop down lists, either a GPS (Global Positioning System) receiver 162 or cellular positioning equipment 164 (see FIG. 1), included in the telecommunications device 10, may be activated to perform a location determination. The location determination made by either the GPS receiver 162 or the cellular positioning equipment 164 is used by the dialer program 28 in determining whether the location of the telecommunications device 10 matches the location of the selected dialing string at the nodes 78 and 112 (FIG. 13).

In a further implementation, a successful or "good" dialing string is determined separate from making the actual data connection to the external network 22. For example, the dialing string being tested is dialed using the Telephony API (Application Program Interface), or TAPI. If the dialing string is deemed good (a network modem answers), the line is placed on-hook (hangup). The data connection is then made, using RAS (Remote Access Service) for example, using the good dialing string as previously determined.

While the invention has been described with particular reference to the drawings, it should be understood that various modifications could be made without departing from the spirit and scope of the present invention.

What is claimed is:

1. A method of compiling a list of telephone dialing strings for a telecommunications device for connection of the telecommunications device to a network external to the telecommunications device, said method comprising the steps of:
   storing a plurality of different dialing strings each associated with the external network;
   selecting one of the plurality of different dialing strings based on location of the telecommunications device;
   storing user related information including (a) whether connection to the external network is to be wireless or wired, (b) if the connection to the external network is to be wired, whether a dial-prefix is needed to obtain an outside line, and (c) if the connection to the external network is to be wireless, whether the telecommunications device is in its home system or roaming; and
   developing a list of dialing strings varying from highest priority to lowest priority based upon the selected dialing string and the stored user related information.

2. The method of claim 1, further comprising the steps of:
   dialing the dialing string having the highest priority; and
   if connection to the external network is unable to be established by dialing the highest priority dialing string, dialing the other dialing strings in the prioritized list, in turn in accordance with their priority listing, until connection to the external network is established or all dialing strings have been exhausted.

3. The method of claim 2, wherein a condition of being unable to establish connection to the external network does not include obtaining a busy signal when the dialing string is dialed.

4. The method of claim 1, wherein the telecommunications device comprises a laptop computer having at least one of a wired modem and a wireless modem.

5. The method of claim 1, wherein the stored plurality of different dialing strings each include associated location information, said method further comprising the steps of:
   storing location information for a current location of the telecommunications device;
   comparing the current location information of the telecommunications device with the location information associated with the selected dialing string;
   if the current location and the location associated with the selected dialing string match, prioritizing local calls higher than long distance calls; and
   if the current location and the location associated with the selected dialing string do not match, prioritizing long distance calls higher than local calls.

6. The method of claim 5, wherein the location information for a current location of the telecommunications device is obtained by activating one of a GPS receiver and cellular positioning equipment resident within the telecommunications device.

7. The method of claim 1, further comprising the step of developing a prioritized list of dial prefixes for obtaining an outside line if a dial prefix is needed to obtain the outside line.

8. The method of claim 7, wherein the prioritized list of dial prefixes includes, in order, a user provided dial prefix, if any, and then 9, 0, 8, 7, 6, 5, 4, 3, 2 and 1, skipping over the user provided dial prefix, if any.

9. The method of claim 1, wherein the external network includes at least one of a private network and a public network.

10. The method of claim 9, wherein the public network comprises the Internet.

11. The method of claim 1, further comprising the step of performing an outside line test to determine an appropriate dial prefix for obtaining the outside line if a dial prefix is needed to obtain an outside line.

12. The method of claim 11, wherein the step of performing an outside line test comprises the steps of:
   developing a list of dial prefixes varying from highest priority to lowest priority for obtaining the outside line;
   dialing the dial prefix having the highest priority; and
   if a dial tone is not detected, dialing the other dial prefixes in the prioritized list, in turn in accordance with their priority listing, until a dial tone is detected or all dial prefixes have been exhausted.

13. The method of claim 12, further comprising the step of storing the dialed dial prefix as the appropriate dial prefix for obtaining the outside line upon detection of a dial tone.

14. The method of claim 12, wherein the prioritized list of dial prefixes includes, in order, a user provided dial prefix, if any, and then 9, 0, 8, 7, 6, 5, 4, 3, 2 and 1, skipping over the user provided dial prefix, if any.

15. A telecommunications device comprising a user input device and a modem for connection to an external network, each controlled by a processor, the telecommunications device further comprising:
   a memory, operable to store a plurality of different dialing strings, each associated with the external network; and
   a dialer program operating in the telecommunications device for prioritizing a plurality of different dialing strings, highest to lowest, each associated with the external network for connection of the telecommunications device to the external network based on the location of the telecommunications device, and wherein the dialer program receives, via the user input device, (a) a selected dialing string from the plurality of different dialing strings, and (b) user related information comprising (b1) whether connection to the external network is to be wireless or wired, (b2) if the connection to the external network is to be wired, whether a dial prefix is needed to obtain an outside line, and (b3) if the connection to the external network is to be wireless, whether the telecommunications device is in its home system or roaming, the prioritizing of the plurality of different dialing strings being based on the selected dialing string and the stored user related information.

16. The telecommunications device of claims 15, wherein if a dial prefix is needed to obtain an outside line the dialer program develops a prioritized list of dial prefixes for obtaining the outside line.

17. The telecommunications device of claim 16, wherein the prioritized list of dial prefixes developed by the dialer program includes, in order, a user provided dial prefix, if any, and then 9, 0, 8, 7, 6, 5, 4, 3, 2, 1, skipping over the user provided dial prefix, if any.

18. The telecommunications device of claim 16, wherein if a dial prefix is needed to obtain an outside line the dialer program determines an appropriate dial prefix for obtaining the outside line by dialing the dial prefix having the highest priority from the prioritized list, and if a dial tone is not detected, dialing the other dial prefixes, in the prioritized list, in turn in accordance with their priority listing, until a dial tone is detected or all dial prefixes have been exhausted.

19. A software program for causing a telecommunications device to compile a list of telephone dialing strings for a telecommunications device for connection of the telecommunications device to a network external to the telecommunications device by performing the method of:

storing a plurality of different dialing strings each associated with the external network;

selecting one of the plurality of different dialing strings based on location of the telecommunications device;

storing user related information including (a) whether connection to the external network is to be wireless or wired, (b) if the connection to the external network, is to be wired, whether a dial prefix is needed to obtain an outside line, and (c) if the connection to the external network is to be wireless, whether the telecommunications device is in its home system or roaming; and developing a list of dialing strings varying from highest priority to lowest priority based upon the selected dialing string and the stored user related information.

20. The software program of claim 19, wherein the method further comprises:

dialing the dialing string having the highest priority; and if connection to the external network is unable to be established by dialing the highest priority dialing string, dialing the other dialing strings in the prioritized list, in turn in accordance with their priority listing, until connection to the external network is established or all dialing strings have been exhausted.

21. The software program of claim 20, wherein a condition of being unable to establish connection to the external network does not include obtaining a busy signal when the dialing string is dialed.

22. The software program of claim 19, wherein the stored plurality of different dialing strings each include associated location information, and the method further comprises:

storing location information for a current location of the telecommunications device;

comparing the current location information of the telecommunications device with the location information associated with the selected dialing string;

if the current location and the location associated with the selected dialing string match, prioritizing local calls higher than long distance calls; and if the current location and the location associated with the selected dialing string do not match, prioritizing long distance calls higher than local calls.

23. The software program of claim 22, wherein the location information for a current location of the telecommunications device is obtained by activating one of a GPS receiver and cellular positioning equipment resident within the telecommunications device.

24. The software program of claim 19, further comprising the step of developing a prioritized list of dial prefixes for obtaining an outside line if a dial prefix is needed to obtain the outside line.

25. The software program of claim 24, wherein the prioritized list of dial prefixes includes, in order, a user provided dial prefix, if any, and then 9, 0, 8, 7, 6, 5, 4, 3, 2 and 1, skipping over the user provided dial prefix, if any.

26. The software program of claim 19, wherein the method further comprises performing an outside line test to determine an appropriate dial prefix for obtaining the outside line if a dial prefix is needed to obtain an outside line.

27. The software program of claim 26, wherein the performing of the outside line test comprises:

developing a list of dial prefixes varying from highest priority to lowest priority or obtaining the outside line;

dialing the dial prefix having the highest priority; and if a dial tone is not detected, dialing the other dial prefixes in the prioritized list, in turn in accordance with their priority listing, until a dial tone is detected or all dial prefixes have been exhausted.

28. The software program of claim 27, wherein the method further comprises storing the dialed dial prefix as the appropriate dial prefix for obtaining the outside line upon detection of a dial tone.

29. The software program of claim 27, wherein the prioritized list of dial prefixes includes, in order, a user provided dial prefix, if any, and then 9, 0, 8, 7, 6, 5, 4, 3, 2 and 1, skipping over the user provided dial prefix, if any.

* * * * *